Aug. 11, 1953
R. M. ULRICH
2,648,553
DUSTPROOF HYDRAULIC COUPLING
Filed March 13, 1951
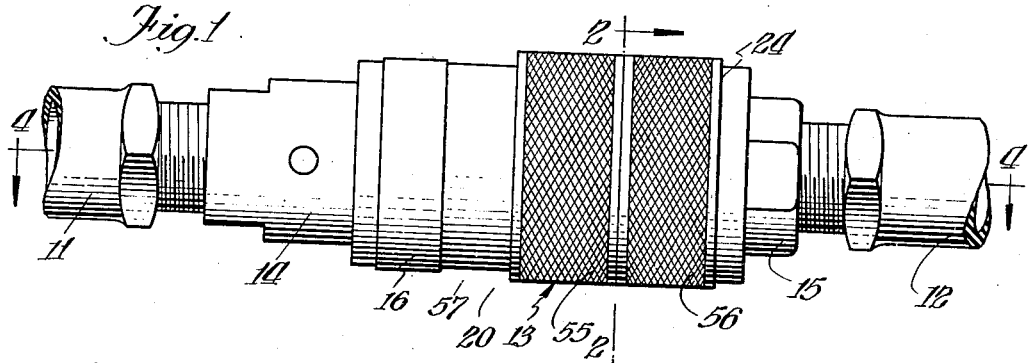
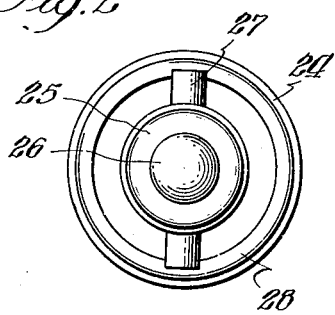
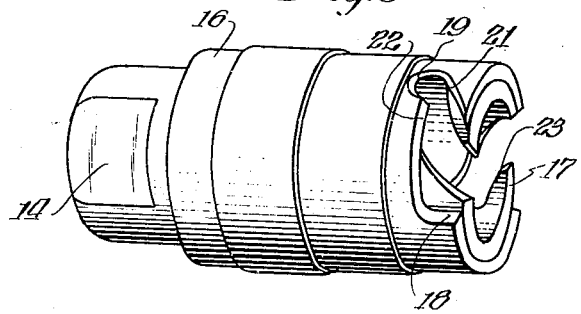
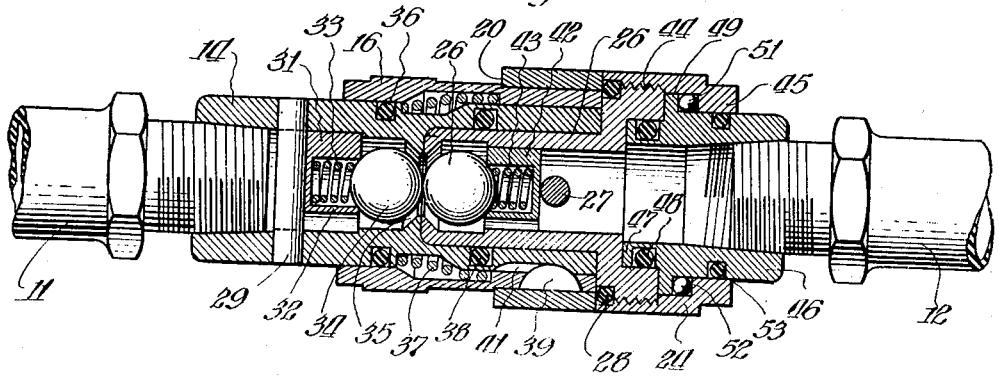
Inventor:
Raymond M. Ulrich
By: Alois W. Graf
Attorney Patented Aug. 11, 1953

2,648,553

UNITED STATES PATENT OFFICE 2,648,553

DUSTPROOF HYDRAULIC COUPLING

Raymond M. Ulrich, Roanoke, Ill., assignor to Ulrich Foundation, Inc., a corporation of Delaware Application March 13, 1951, Serial No. 215,338

3 Claims. (Cl. 285—178)

The present invention relates to an improved separable hydraulic coupling, and more particularly to such coupling which is so constructed as to be substantially dust free.

It has now become customary for manufacturers of tractors to provide on the tractor a source of hydraulic power. This power is controlled and used for the control of hydraulically adjusted or actuated implements and farm equipment drawn by the tractor. It has been customary to provide a safety arrangement in the hitch between the tractor and the draw bar of such implement to bring about an unhitching action whenever the implement becomes stuck or encounters some obstruction.

This safety arrangement, therefore, prevents undue damage to the implement. Accordingly, it is also necessary to provide some means for uncoupling the hydraulic conduit or conduits extending between the tractor and the implement. For this purpose there have been provided separable hydraulic couplings which, usually by means of a reciprocable sleeve, produce an uncoupling action. It has been found, however, that in devices thus far provided reliable operation is not always assured because dust enters into the crevices and certain working parts of the coupling. It therefore would be desirable to provide an improved coupling which is substantially immune to the effects of dust and other foreign matter.

It is therefore an object of the present invention to provide an improved separable hydraulic coupling which is substantially not affected by operation under dusty conditions.

A further object of the present invention is to provide an improved hydraulic coupling device which in coupled relation does not permit the entry of dust and foreign material.

A further object of the present invention is to provide an improved coupling for hydraulic conduits which has a swivel connection.

Other and further objects of the present invention subsequently will become apparent by referring to the following description taken in conjunction with the accompanying drawing wherein:

Figure 1 is a plan view of a separable coupling constructed in accordance with the present invention;

Figure 2 is an end view of one portion of the coupling as seen in the direction of the arrows along the line 2—2 of Figure 1;

Figure 3 is a perspective view of the other portion of the coupling with one element thereof removed; and Figure 4 is a cross-sectional view of the coupling shown in Figure 1 as seen in the direction of the arrows along the line 4—4.

Referring to Figure 1 of the drawing there are shown hydraulic conduits 11 and 12 interconnected by a separable hydraulic coupling 13. The coupling unit 13 has a female body portion 14 and a male body portion 15 retained in coupled relation by a structure subsequently to be described. The female body member carries a reciprocable sleeve 16 which is shown in Figure 3. One end of the sleeve 16 is spring biased so as to be normally flush with one end 17 of the female body portion 14. This end of the sleeve 16 has two similar diametrically arranged cut-away portions. Each portion 18 has an arcuate recess 19 adapted to engage one of two oppositely arranged projecting pins on the male member 15. Immediately adjacent the recess 19, which serves as a latching member, there is provided an inclined surface 21 arranged to engage another portion of the pin whenever the sleeve 16 is reciprocated in a direction in opposition to the spring biasing means.

The cut-away portion 18 also has a straight or annular portion 22, which is engaged by the pins whenever the two coupling portions are being connected together. The pin, therefore, engages the straight portion 22 to reciprocate the sleeve sufficiently to permit the pins to reach their ultimate position.

The end 17 of the female member 14 is provided with two opposite, angularly arranged, inclined slots 23 adapted to be engaged by the pins of the male member 15. When the pins reach the bottom of the slots 23 the latching portions 19 of the cut-away portions 18 of the sleeve 16 serve to hold the two coupling members in coupled relation.

It will be noted that in Figure 3 the end of the sleeve 16, which is provided with the cut-away portions 18, appears to have a reduced diameter in order that it may receive a ring 20 which encloses the cut-away portions 18 and the slots 23 in normal position.

Figure 2 is an end view of the male member which has an enlarged cylindrical body portion 24 of the same diameter as the maximum diameter of the sleeve member 16. The male member 15 has a reduced diameter portion 25 having at its end a closure ball 26. Two projecting pins 27 extend outwardly from the reduced diameter portion 25 so as normally to extend beyond the slots 23 of the female member 17 and into engagement with the cut-away portions 18 of the sleeve 16. The face of the enlarged body portion 24 is provided with an annular recess which carries a packing ring 28. The radius of the groove for the packing ring 28 is substantially that of the inner diameter of the ring 20.

Certain further details of the construction are illustrated in Figure 4 from which it will be seen that a pin 29 extends through the central bore of the female member 14. Mounted against the pins is a stop member 31 having three or more legs and a central cylindrical portion 32. The central cylindrical portion 32 is hollow and carries a spring 33 which engages a closure ball 34. The closure ball is arranged to seat against a valve seat 35 whenever the device is uncoupled. The closure ball 34 normally when seated protrudes beyond the end surface of the seat 35 so that it will be engaged by the closure ball 26 of the male member. The female body portion 14 is provided with an annular recess carrying a packing ring 36, which engages the inner surface of the sleeve 16. Both the sleeve 16 and the female member 14 are provided with recessed portions for receiving the biasing spring 37, which normally urges the sleeve to position where it is flush with the end 17 of the female member 14. The female member 14 has an inner passage for receiving the reduced diameter portion 25 of the male member. This passage is provided with an annular recess carrying a packing ring 38 so that a fluid tight connection is obtained between the male and female portions of the coupling prior to the time that the closure balls 34 and 26 are displaced from their respective seats.

The sleeve 16 beneath the ring 20 carries a key 39 which moves in a key-way 41 formed in the body of the female member 14. Thus the key 39 limits the movement of the sleeve 16 to a linear direction.

It will be noted that the pin 27 is engaged by a ball stop structure 42 having a central recess containing a biasing spring 43. This spring normally urges the closure ball 26 against its seat. From Figure 4 it will be noted that the stop members 31 and 42 limit the movements of the balls 34 and 26 to a certain position whereby the balls are arranged in axial alignment. This provides a passageway which will have a minimum effect in turbulence on fluid following therethrough.

It will be seen that the body 26 of the male member carries the enlarged portion 24 as a separate member which is held in position by cooperating thread structure 44. The member 24, therefore, is a coupling collar having a reduced internal diameter portion 45 arranged opposite a rotatably mounted portion 46. The rotatably mounted portion 46 has an axial bore provided with threads for engaging a coupling remaining portions of the coupling. The relative motion of the sleeve 16 from the coupled position brings the surfaces 21 into contact with the ends of the pins 27 thereby initiating a rotary movement of the male portion 25. The pins 27 thereafter, due to hydraulic pressure within the axial passages of the male and female portions, and the axial strain move along the grooves 23. As soon as the balls 34 and 26 reach their seats, no further action may be attributed to the hydraulic pressure, but the axial strain continues to work and bring about the remaining uncoupling action.

In order to couple the two portions of the coupling together it is only necessary to insert the pins 27 into the slots 23 and to push the two male and female members toward each other. The pins 27 will move down the slots 23 producing a turning motion of the male member with respect to the female member. The outer extremities of the pins 27 when in engagement with the straight surfaces 22 of the cut-away portions 18 produces a longitudinal movement of the sleeve 16. After the pins 27 have reached the bottoms of the grooves 23, the recesses 18 of the sleeve 16 will be engaged to produce a latching action by a return movement of the sleeve. The pins 27 thereafter cannot of themselves move out of their positions until there is a relative motion of the sleeve 16 with respect to the female member 14 brought about by an axial force.

While for the purpose of illustrating and describing the present invention a preferred embodiment has been shown in the drawing, it is to be understood that such variations in the arrangement and in the components employed are contemplated as may be commensurate with the spirit and scope of the invention set forth in the accompanying claims.

I claim as my invention:

1. A separable coupling comprising a cylindrical male member having oppositely arranged projecting pins, a female member therefor having at one end oppositely arranged inclined slots, said pins protruding beyond said slots when said members are coupled together, a reciprocable sleeve surrounding said female member, means limiting said sleeve to linear movement and biasing said sleeve toward the slotted end of said female member so as to be normally flush therewith, said sleeve having at one end oppositely arranged axially transverse cut-away portions each provided at one end of said transverse portion with a latching recess for said pins and an inclined surface adjacent thereto for engaging said pins when said sleeve is reciprocated to produce rotary and linear motion of said male member, said inclined portion being at a lesser angle to the axis of said coupling than said inclined slot, annular means enclosing said cut-away portions of said sleeve, said male member having a cylindrical portion in abutment with said sleeve and said annular enclosing means when coupled together.

2. A separable coupling comprising a cylindrical male member having oppositely arranged projecting pins, a female member therefor having at one end oppositely arranged inclined slots, said pins protruding beyond said slots when said members are coupled together, a reciprocable sleeve surrounding said female member, means limiting said sleeve to linear movement and biasing said sleeve toward the slotted end of said female member so as to be normally flush therewith, said sleeve having at one end oppositely arranged axially transverse cut-away portions each provided with a latching recess for said pins and an inclined surface adjacent thereto for engaging said pins when said sleeve is reciprocated to produce rotary and linear motion of said male member, a fixed annular member enclosing said cut-away portions of said sleeve, said male member having a cylindrical portion as large as said annular enclosing member in abutment with said sleeve when coupled together, and a packing ring carried by a recess in the face of said cylindrical portion for engagement by said sleeve and said fixed annular member.

3. A separable coupling comprising a cylindrical male member having oppositely arranged projecting pins, a female member therefor having at one end oppositely arranged inclined slots, said pins protruding beyond said slots when said members are coupled together, a reciprocable sleeve surrounding said female member, means limiting said sleeve to linear movement and biasing said sleeve toward the slotted end of said female member so as to be normally flush therewith, said sleeve having at one end oppositely arranged axially transverse cut-away portions each provided at one end thereof with a latching recess for said pins and an inclined surface adjacent thereto of lesser angle to the axis of said coupling than said inclined slots for engaging said pins when said sleeve is reciprocated to produce rotary and linear motion of said male member, a tubular collar enclosing said cutaway portions of said sleeve, said male member having a cylindrical portion of the same diameter as said tubular collar enclosing said cutaway portions of said sleeve and being in abutment thereto when coupled together, a recess in the face of said cylindrical portion of said male member having a radius substantially equal to the radius of said reciprocable sleeve, and a packing ring mounted in said recess.

RAYMOND M. ULRICH.

References Cited in the file of this patent

UNITED STATES PATENTS

| Number | Name | Date |
|---|---|---|
| 1,871,370 | Jacques | Aug. 9, 1932 |
| 2,076,918 | Robison | Apr. 13, 1937 |
| 2,248,701 | Fowler | July 8, 1941 |
| 2,339,746 | Marchus | Jan. 18, 1944 |
| 2,402,616 | Fenton | June 25, 1946 |
| 2,533,640 | Ulrich | Dec. 12, 1950 |

FOREIGN PATENTS

| Number | Country | Date |
|---|---|---|
| 9,145 | Great Britain | Dec. 21, 1911 |